(12) United States Patent
Lohmeier et al.

(10) Patent No.: US 7,379,018 B1
(45) Date of Patent: May 27, 2008

(54) SYSTEM AND METHOD FOR VERIFYING A RADAR DETECTION

(75) Inventors: Stephen P. Lohmeier, Westford, MA (US); Yong Liu, Acton, MA (US)

(73) Assignee: Valeo Raytheon Systems, Inc., Hudson, NH (US)

( * ) Notice: Subject to any disclaimer, the term of this patent is extended or adjusted under 35 U.S.C. 154(b) by 32 days.

(21) Appl. No.: 11/324,073

(22) Filed: Dec. 30, 2005

(51) Int. Cl.
*G01S 7/40* (2006.01)
*G01S 7/35* (2006.01)
*G01S 13/93* (2006.01)

(52) U.S. Cl. .................. 342/173; 342/27; 342/70; 342/89; 342/159; 342/165; 342/175; 342/195; 342/196

(58) Field of Classification Search .......... 342/21, 342/27, 28, 70–72, 89–103, 118, 128–144, 342/159, 165, 173, 175, 192–197; 180/167–169; 701/300, 301
See application file for complete search history.

(56) References Cited

U.S. PATENT DOCUMENTS

| | | | |
|---|---|---|---|
| 2,540,839 A | | 2/1951 | Southworth |
| 3,487,405 A | * | 12/1969 | Soupirot et al. ............... 342/91 |
| 3,587,097 A | * | 6/1971 | Stull, Jr. ....................... 342/93 |
| 3,668,702 A | * | 6/1972 | Jones ............................ 342/91 |
| 3,701,149 A | * | 10/1972 | Patton et al. .................. 342/93 |
| 3,761,922 A | * | 9/1973 | Evans ........................... 342/93 |
| 3,775,770 A | * | 11/1973 | Dillard et al. ................. 342/90 |
| 3,778,822 A | * | 12/1973 | Bauer ............................ 342/93 |
| 3,778,825 A | * | 12/1973 | Ares et al. ..................... 342/91 |
| 3,801,983 A | * | 4/1974 | Woolley ........................ 342/93 |
| 3,950,748 A | * | 4/1976 | Busy ............................. 342/93 |
| 3,968,490 A | * | 7/1976 | Gostin ........................... 342/93 |
| 3,995,270 A | * | 11/1976 | Perry et al. ................... 342/93 |
| 4,067,013 A | * | 1/1978 | Smith ............................ 342/91 |
| 4,074,264 A | * | 2/1978 | Wilmot ......................... 342/90 |
| 4,075,703 A | * | 2/1978 | Dillard .......................... 342/93 |
| 4,213,127 A | * | 7/1980 | Cole ............................. 342/93 |
| 4,249,177 A | * | 2/1981 | Chen ............................. 342/93 |
| 4,286,236 A | | 8/1981 | Fischer |

(Continued)

OTHER PUBLICATIONS

Cheng; "A Fast Hybrid MoM/FEM Technique for Microstripline Vertical Couplers With Multiple Identical Cavaties;" IEEE Jun. 2003; 0-7803-7846; pp. 1076-1079.

(Continued)

*Primary Examiner*—Bernarr E Gregory
(74) *Attorney, Agent, or Firm*—Daly, Crowley, Mofford & Durkee, LLP (57) ABSTRACT

The method and system provide provisions for generating a respective detection state value associated with each of a plurality of RF receive beams. A first state value is indicative of a detection. The method and system further provide provisions, for each of the detection state values equal to the first state value, for generating a respective detection range value. The method and system further provide provisions for selecting one of the detection state values equal to the first state value and verifying the selected detection state value to provide one of a positive verification and a negative verification associated with the selected detection state value. The method and system further provide provisions for setting the selected detection state value to be equal to the second state value in response to a negative verification.

14 Claims, 7 Drawing Sheets

U.S. PATENT DOCUMENTS

| | | | |
|---|---|---|---|
| 5,194,823 | A | 3/1993 | Wendt et al. |
| 5,485,157 | A * | 1/1996 | Long .......................... 342/159 |
| 5,499,030 | A * | 3/1996 | Wicks et al. .................. 342/93 |
| 5,592,178 | A | 1/1997 | Chang et al. |
| 5,703,592 | A * | 12/1997 | Watts .......................... 342/93 |
| 5,708,433 | A | 1/1998 | Craven |
| 5,727,023 | A | 3/1998 | Dent |
| 5,949,368 | A * | 9/1999 | DeCesare .................... 342/93 |
| 6,039,580 | A | 3/2000 | Sciarretta et al. |
| 6,167,286 | A | 12/2000 | Ward et al. |
| 6,198,449 | B1 | 3/2001 | Muhlhauser et al. |
| 6,218,987 | B1 | 4/2001 | Derneryd et al. |
| 6,324,755 | B1 | 12/2001 | Borkowski et al. |
| 6,463,303 | B1 | 10/2002 | Zaho |
| 6,489,927 | B2 | 12/2002 | LeBlanc et al. |
| 6,492,949 | B1 | 12/2002 | Berglia et al. |
| 6,501,415 | B1 | 12/2002 | Viana et al. |
| 6,577,269 | B2 | 6/2003 | Woodington et al. |
| 6,577,879 | B1 | 6/2003 | Hagerman et al. |
| 6,642,908 | B2 | 11/2003 | Pleva et al. |
| 6,683,557 | B2 | 1/2004 | Pleva et al. |
| 6,738,017 | B2 | 5/2004 | Jacomb-Hood |
| 6,771,209 | B1 * | 8/2004 | Long .......................... 342/93 |
| 6,784,838 | B2 | 8/2004 | Howell |
| 6,864,699 | B2 | 3/2005 | Sakayori et al. |
| 6,933,900 | B2 | 8/2005 | Kitamori et al. |
| 6,995,730 | B2 | 2/2006 | Pleva et al. |
| 7,038,608 | B1 | 5/2006 | Gilbert |
| 2004/0027305 | A1 | 2/2004 | Pleva et al. |
| 2004/0164892 | A1 | 8/2004 | Shinoda et al. |
| 2004/0208249 | A1 | 10/2004 | Risbo et al. |
| 2006/0125682 | A1 | 6/2006 | Kelly, Jr. et al. |

OTHER PUBLICATIONS

Gao et al.: "Adaptive Linearization Schemes for Weakly Nonlinear Systems Using Adaptive Linear and Nonlinear FIR Filters;" Dept. of Electrical Engineering, University of Toronto; IEEE; Jan. 1991; CH2819-1/90/0000-0009; pp. 9-12.

Lin et al.; "A High Speed Low-Noise Equalization Technique with Improved Bit Error Rate;" EEE; Jul. 2002; 0-7803-7448; pp. 564-567.

Lohinetong et al.; "Microstrip To Surface Mounted Foam-Based Waveguide Transition For Ka-Band Filter Integration;" IEEE Jun. 2004; 0-7803-8401; pp. 899-902.

Mueller; "SMD-Type 42 GHz Waveguide Filter;" IEEE Jan. 2003; 0-7803-7695; pp. 1089-1092.

Nordsjo; "An Algorithm for Adaptive Predisortion of Certain Time-Varying Nonlinear High-Power Amplifiers;" 2002 The Institution of Electrical Engineers; XP-002364938; pp. 469-473.

EP Search Report and Written Opinion of the European Patent Office for EP 05 11 1991.5; dated Mar. 2, 2006.

EP Search Report and Written Opinion of the European Patent Office for EP 05 11 1994.9 dated Mar. 31, 2006.

EP Report and Written Opinion of the European Patent Office for EP 05 111 983.2 dated Apr. 7, 2006.

Pleva, et al.; "Beam Architecture For Improving Angular Resolution"; U.S. Appl. No. 11/026,506, filed Dec. 30, 2004.

Gilbert; "Digital to Analog Converter;" U.S. Appl. No. 11/013,950, filed Dec. 16, 2004.

Leblanc et al.; "Vehicle Radar Sensor Assembly"; U.S. Appl. No. 11/323,816, filed Dec. 30, 2005.

Pleva, et al.; "Waveguide—Printed Wiring Board (PWB) Interconnection"; U.S. Appl. No. 11/027,523, filed Dec. 30, 2004.

Kelly, Jr. et al.; "Method and System for Radar Processing;" U.S. Appl. No. 11/458,126, filed Jul. 18, 2006.

Woodington, et al.; "Detecting Signal Interference In A Vehicle System"; U.S. Appl. No. 11/427,829, filed Jun. 30, 2006.

Gilbert; "Multi-Stage Finite Impulse Response Filter Processing"; U.S. Appl. No. 11/323,459, filed Dec. 30, 2005.

Woodington, et al.; "Multichannel Processing Of Signals In A Radar System"; U.S. Appl. No. 11/323,458, filed Dec. 30 2005.

Woodington, et al.; "Vehicle Radar Systems Having Multiple Operating Modes"; U.S. Appl. No. 11/324,035, filed Dec. 30, 2005.

Hunt; "Generating Event Signals In A Radar System;" U.S. Appl. No. 11/323,960, filed Dec. 30, 2005.

Lohmeier et al.; "System And Method For Generating A Radar Detection Threshold;" U.S. Appl. No. 11/322,684, filed Dec. 30, 2005.

Lohmeier et al.; "Method And System For Generating A Target Alert;" U.S. Appl. No. 11/322,869, filed Dec. 30, 2005.

* cited by examiner

MAJOR CYCLE — 220

| | 222a | 222b | 222c | 222d | 222e | 222f | 222g |
|---|---|---|---|---|---|---|---|
| DETECTION STATE VALUES | T | F | F | T | F | T | T |
| DETECTION RANGE VALUES | Range A | N/A | N/A | Range A | N/A | Range A | Range A |
| | 224a | 224b | 224c | 224d | 224e | 224f | 224g |

— 226

| | 228a | 228b | 228c | 228d | 228e | 228f | 228g |
|---|---|---|---|---|---|---|---|
| VERIFIED DETECTION STATE VALUES | F | F | F | T | F | T | T |

FIG. 6A

MAJOR CYCLE — 230

| | 232a | 232b | 232c | 232d | 232e | 232f | 232g |
|---|---|---|---|---|---|---|---|
| DETECTION STATE VALUES | T | T | F | T | F | T | T |
| DETECTION RANGE VALUES | Range A | Range B | N/A | Range A | N/A | Range A | Range A |
| | 234a | 234b | 234c | 234d | 234e | 234f | 234g |

— 236

| | 238a | 238b | 238c | 238d | 238e | 238f | 238g |
|---|---|---|---|---|---|---|---|
| VERIFIED DETECTION STATE VALUES | F | F | F | T | F | T | T |

FIG. 7

SYSTEM AND METHOD FOR VERIFYING A RADAR DETECTION

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to vehicle radar systems and more particularly to vehicle radar systems adapted to detect other vehicles and objects in proximity to the vehicle.

BACKGROUND OF THE INVENTION

As is known by those in the art, radar systems have been developed for various applications associated with vehicles, such as automobiles and boats. A radar system mounted on a vehicle detects the presence of objects including other vehicles in proximity to the vehicle. In an automotive application, such a radar system can be used in conjunction with the braking system to aid in collision avoidance or in conjunction with the automobile cruise control system to provide intelligent speed and traffic spacing control. In a further application, the vehicle radar system provides a passive indication of obstacles to a driver of the vehicle on a display, and in particular, detects objects in a so-called blind spot of the vehicle.

In an effort to reduce the number and impact of blind spots, rear and side view mirrors of various sizes and types are typically mounted on the vehicle. While the use of mirrors helps reduce the number of blind spots on a vehicle, mirrors cannot eliminate all blind spots. Also, the view through mirrors degrades during conditions of rain, snow, or darkness.

Cameras mounted on the back and sides of a vehicle can also be effective in reducing blind spots. However, this approach is relatively expensive and at least a portion of the camera must be exposed to external elements. Also, the view through a camera degrades during severe weather (e.g. rain, show) and in darkness.

SUMMARY OF THE INVENTION

The present invention provides a system and method for generating a radar detection threshold. While examples of the method and system shown below include a radar system as used on an automobile, and, in particular, a radar system used for side object detection, the method and system apply to any radar system that uses a detection threshold.

In accordance with the present invention, a method of verifying a radar detection includes transmitting a plurality of RF signal and receiving a plurality of composite signals associated with a respective plurality of receive beams. The method further includes generating a respective detection state value associated with each of the receive beams. Each one of the detection state values is equal to a selected one of a first state value and a second state value, wherein the first state value is indicative of a detection. The method further includes, for each of the detection state values equal to the first state value, generating a respective detection range value. The method further includes selecting one of the detection state values equal to the first state value and verifying the selected detection state value to provide one of a positive verification and a negative verification associated with the selected detection state value. The method further includes setting the selected detection state value to be equal to the second state value in response to a negative verification.

In accordance a further aspect of the present invention apparatus for verifying a radar detection includes a radar transmitter adapted to transmit a plurality of RF signals and a radar receiver adapted to receive a plurality of composite signals associated with a respective plurality of receive beams. The apparatus further includes a detection processor adapted to generate a respective detection state value associated with each of the receive beams. Each one of the detection state values is equal to a selected one of a first state value and a second state value, wherein the first state value is indicative of a detection. The detection processor is further adapted to generate a respective detection range value for each of the detection state values equal to the first state value. The apparatus further includes a detection verification processor adapted to select one of the detection state values equal to the first state value and further adapted to verify the selected detection state value to provide one of a positive verification and a negative verification associated with the selected detection state value. The verification processor is still further adapted to set the selected detection state value to be equal to the second state value in response to a negative verification.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "received RF signal" is used to describe a radio frequency (RF) signal received by a receiving radar antenna. As used herein, the term "transmitted RF signal" is used to describe an RF signal transmitted through a transmitting radar antenna. The transmit and receive antennas may be the same physical antenna (i.e. one antenna is used for both transmit and receive paths of the radar system) or may be separate antennae. As used herein, the term "echo RF signal" is used to describe an RF signal resulting from a transmitted RF signal impinging upon an object and reflecting and/or scattering from the object. As used herein, the term "interfering RF signal" is used to describe an RF signal generated (or otherwise provided by or resultant from) another radar system.

In view of the above definitions, it should be appreciated that a received RF signal may or may not include an echo RF signal. The received RF signal may also include or not include an interfering RF signal.

As used herein, the term "composite signal" is used to describe a signal with contributions from at least one of a received RF signal and a noise signal.

As used herein, the term "chirp signal" (or more simple "chirp") is used to describe a signal having a frequency that varies with time during a time window, and which has a start frequency and an end frequency associated with each chirp. A chirp can be a linear chirp, for which the frequency varies in a substantially linear fashion between the start and end frequencies. A chirp can also be a non-linear chirp, in which the frequency varies in a substantially non-linear fashion between the start and end frequencies. A chirp signal can be transmitted through a variety of media, for example, through the air as a transmitted RF chirp signal, or through some other type of transmission media (e.g. a coaxial cable).

As used herein, the term "controller area network" or "CAN" is used to describe a control bus and associated control processor commonly disposed in automobiles. The CAN bus is typically coupled to a variety of vehicle systems (e.g. air bag, brakes, etc.) A CAN processor is coupled to vehicle systems through the CAN bus which allows the CAN processor to control a variety of automobile functions, for example, anti-lock brake functions. The CAN network may be implemented as a wired or a wireless network.

Reference is made herein below to certain processing operations, which are accomplished using fast Fourier transforms (FFTs). It should, of course, be appreciated that other techniques can also be used to convert time domain signals to the frequency domain. These techniques include, but are not limited to, discrete Fourier transforms (DFTs).

Figure 1:
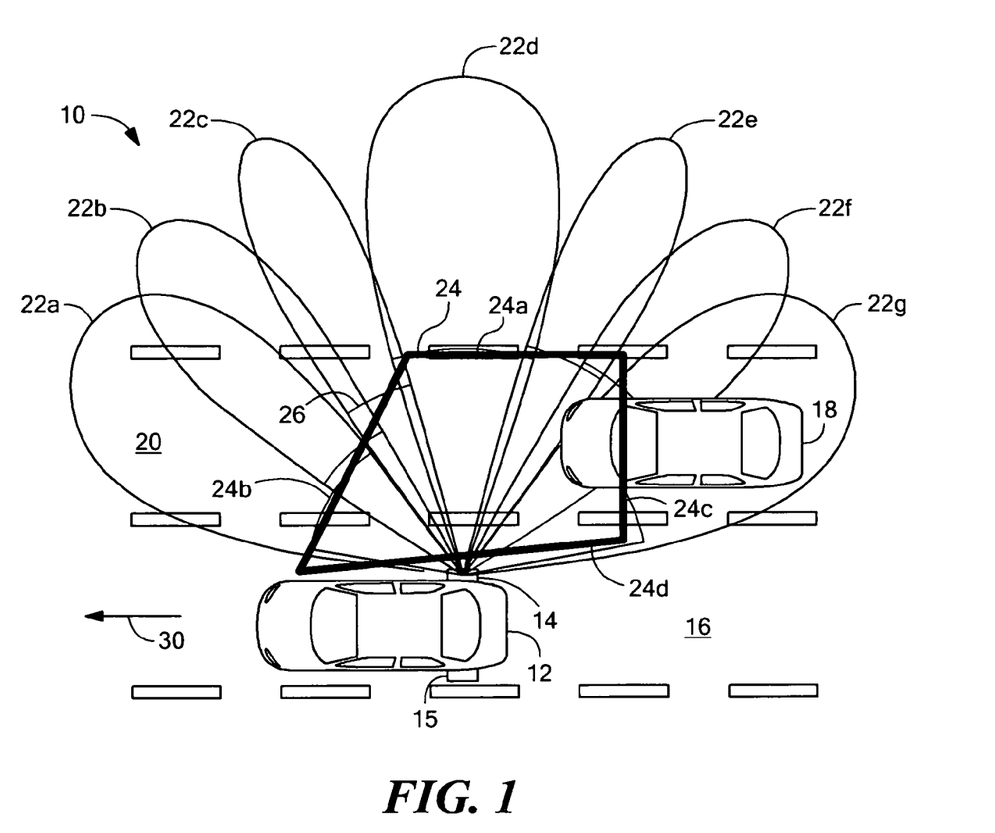
FIG. 1 is a pictorial of a vehicle on which a side object detection (SOD) radar is mounted, which is traveling on a roadway.

Referring to FIG. 1, a first vehicle 12 traveling in a first traffic lane 16 of a road includes a side object detection (SOD) radar 14. The SOD radar 14 is disposed on a side portion of the vehicle 12 and in particular, the SOD radar 14 is disposed on a right rear quarter of the vehicle 14. The vehicle 12 also includes a second SOD radar 15 disposed on a side portion of a left rear quarter of the vehicle 12. The SOD radars 14, 15 may be coupled to the vehicle 12 in a variety of ways. In some embodiments, the SOD radars may be coupled to the vehicle 12 as described in U.S. Pat. No. 6,489,927, issued Dec. 3, 2002, which is incorporated herein by reference in its entirety. A second vehicle 18 travels in a second traffic lane 20 adjacent to the first traffic lane 16. The first and second vehicles 12, 18 are both traveling in a direction according to an arrow 30 and in the respective first and second traffic lanes 16, 20.

The second vehicle 18 may be traveling slower than, faster than, or at the same speed as the first vehicle 12. With the relative position of the vehicles 12, 18 shown in FIG. 1, the second vehicle 18 is positioned in a "blind spot" of the first vehicle 12. The blind spot is an area located on a side of the first vehicle 12 whereby an operator of the first vehicle 12 is unable to see the second vehicle 18 either through side-view mirrors 80, 84 (see FIG. 2) or a rear-view mirror (not shown) of the first vehicle 12.

The SOD radar 14 generates multiple receive beams (e.g., a receive beam 22a, a receive beam 22b, a receive beam 22c, a receive beam 22d, a receive beam 22e, a receive beam 22f and a receive beam 22g) and an associated detection zone 24 having edges 24a-24d. The edges 24a-24c of the detection zone 24 are formed by the SOD radar 14 by way of maximum detection ranges associated with each one of the receive beams 22a-22g, for example, the maximum detection range 26 associated with the receive beam 22c. Each of the receive beams 22a-22g may also have a minimum detection range (not shown), forming the edge 24d of the detection zone 24 closest to the first vehicle. It should be appreciated that in this exemplary embodiment the detection zone 24 is selected having a size and shape such that at least a portion of the detection zone lies over (or "covers") a blind spot of the vehicle.

In one particular embodiment, the SOD radar 14 is a frequency modulated continuous wave (FMCW) radar, which transmits continuous wave chirp RF signals, and which processes received radar signals accordingly. In some embodiments, the SOD radar 14 may be of a type described, for example, in U.S. Pat. No. 6,577,269, issued Jun. 10, 2003; U.S. Pat. No. 6,683,557, issued Jan. 27, 2004; U.S. Pat. No. 6,642,908, issued Nov. 4, 2003; U.S. Pat. No. 6,501,415, issued Dec. 31, 2002; and U.S. Pat. No. 6,492,949, issued Dec. 10, 2002, which are all incorporated herein by reference in their entirety.

In operation, the SOD radar 14 transmits an RF signal. At least portions of the transmitted RF signal impinge upon and are reflected from the second vehicle 18. The reflected signals (also referred to as "echo" RF signals) are received in one or more of the receive beams 22a-22g. Other ones of the radar beams 22a-22g, which do not receive the echo RF signal from the second vehicle 18, receive and/or generate other radar signals, for example, noise signals.

In some embodiments, the SOD radar 14 can transmit RF energy in a single broad transmit beam (not shown). In other embodiments, the SOD radar 14 may transmit RF energy in multiple transmit beams (not shown), for example, in seven transmit beams associated with the receive beams 22a-22g. It should be appreciated, of course, that the principles described herein apply regardless of the particular number of receive beams.

The SOD radar 14 processes the received radar signals associated with each one of the receive beams 22a-22g in sequence, in parallel, or in any other time sequence. The SOD radar 14 detects echo radar signals associated with the second vehicle 18 when any portion of the second vehicle 18 is within the detection zone 24. Therefore, the SOD radar 14 is adapted to detect the second vehicle 18 when at least a portion of the second vehicle is in or near the blind spot of the first vehicle 12.

To this end, signal processing provided by the SOD radar 14, in some embodiments, can be of a type described, for example, in U.S. Pat. No. 6,577,269, issued Jun. 10, 2003, U.S. Pat. No. 6,683,557, issued Jan. 27, 2004, U.S. patent application Ser. No. 11/323,960, filed Dec. 30, 2005, entitled "Generating Event Signals in a Radar System," having inventors Dennis Hunt and Walter Gordon Woodington, and having U.S. patent application Ser. No. 11/322,684, filed Dec. 30, 2005, entitled "System and Method for Generating a Radar Detection Threshold, having inventors Steven P. Lohmeier and Wilson J. Wimmer, and having U.S. patent application Ser. No. 11/322,869, filed Dec. 30, 2005, entitled "Method and System for Generating a Target Alert," having inventors Steven P. Lohmeier, Wilson J. Wimmer, and Walter Gordon Woodington. Each of these patents and patent applications is incorporated herein by reference in its entirety. Further processing of the composite signal by the SOD radar 14 is described more fully below.

Figure 2:
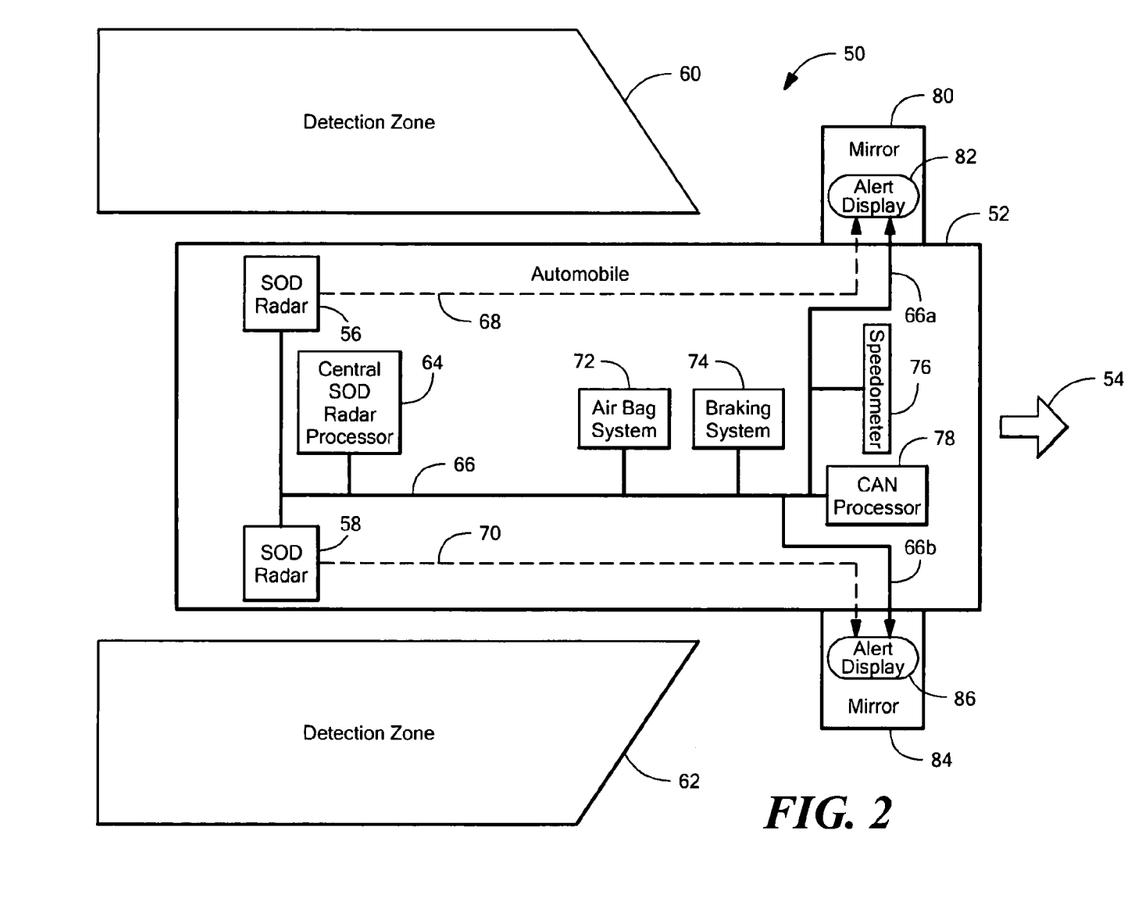
FIG. 2 is a block diagram showing a vehicle on which two SOD radars are mounted.

Referring now to FIG. 2, an exemplary vehicle radar system 50 is associated with an automobile 52 generally traveling in a direction indicated by the arrow identified by reference numeral 54. It should be appreciated, however, that the system 50 does not include all of the mechanical and electrical aspects of the automobile 52. The system 50 includes one or more SOD radars 56, 58. Each one of the SOD radars 56, 58 can be the same as or similar to the SOD radar 14 of FIG. 1. Accordingly, the SOD radar 56 forms a detection zone 60 and the SOC radar 58 forms a detection zone 62.

As described above, the SOD radars 56, 58 can be coupled to the vehicle 52 in a variety of ways. In some embodiments, the SOD radars can be coupled to the vehicle 52 as described in U.S. Pat. No. 6,489,927, issued Dec. 3, 2002, which is incorporated herein by reference it its entirety.

Each one of the SOD radars 56, 58 can be coupled to a central SOD processor 64 via a Controller Area Network (CAN) bus 66. Other automobile systems can also be coupled to the CAN bus 66, for example, an air bag system 72, a braking system 74, a speedometer 76, and a CAN processor 78.

The system 50 includes two side view mirrors 80, 84, each having an alert display 82, 86, respectively, viewable therein. Each one of the alert displays 82, 86 is adapted to provide a visual alert to an operator of the vehicle 52, indicative of the presence of another automobile or other object in a blind spot of the vehicle 52.

Upon detection of an object (e.g., another vehicle) in the detection zone 24, the SOD radar 56 sends an alert signal indicating the presence of an object to either or both of the alert displays 82, 84 through the CAN bus 66. In response to receiving the alert signal, the displays 82, 84 provide an indicator (e.g., a visual, audio, or mechanical indicator), which indicates the presence of an object. Similarly, upon detection of an object in the detection zone 62, the SOD radar 58 sends an alert signal indicating the presence of another vehicle to one or both of alert displays 82, 86 through the CAN bus 66. However, in an alternate embodiment, the SOD radar 56 can communicate the alert signal to the alert display 82 through a human/machine interface (HMI) bus 68. Similarly, the SOD radar 58 can communicate an alert signal to the other alert display 86 through another human/machine interface (HMI) bus 70.

In some embodiments, the central processor 64 can combine or "fuse" data associated with each one of the SOD radars 56, 58, in order to provide fused detections of other automobiles present within the detections zones 60, 62, resulting in further display information in the alert displays 82, 86. Alternatively, the data from each SOD radar 56, 58 can be shared among all SOD radars 56, 58 and each SOD radar 56, 58 can combine (or fuse) all data provided thereto.

While two SOD radars 56, 58 are shown, the system 50 can include any number of SOD radars, including only one SOD radar. While the alert displays 82, 86 are shown to be associated with side view mirrors, the alert displays can be provided in a variety of ways. For example, in other embodiments, the alert displays can be associated with a central rear view mirror. In other embodiments, the alert displays are audible alert displays (e.g. speakers) disposed inside (or at least audible inside) the portion of the vehicle in which passengers sit.

While the CAN bus 66 is shown and described, it will be appreciated that the SOD radars 56, 58 can couple through any of a variety of other busses within the vehicle 52, including, but not limited to, an Ethernet bus, and a custom bus.

Figure 3:
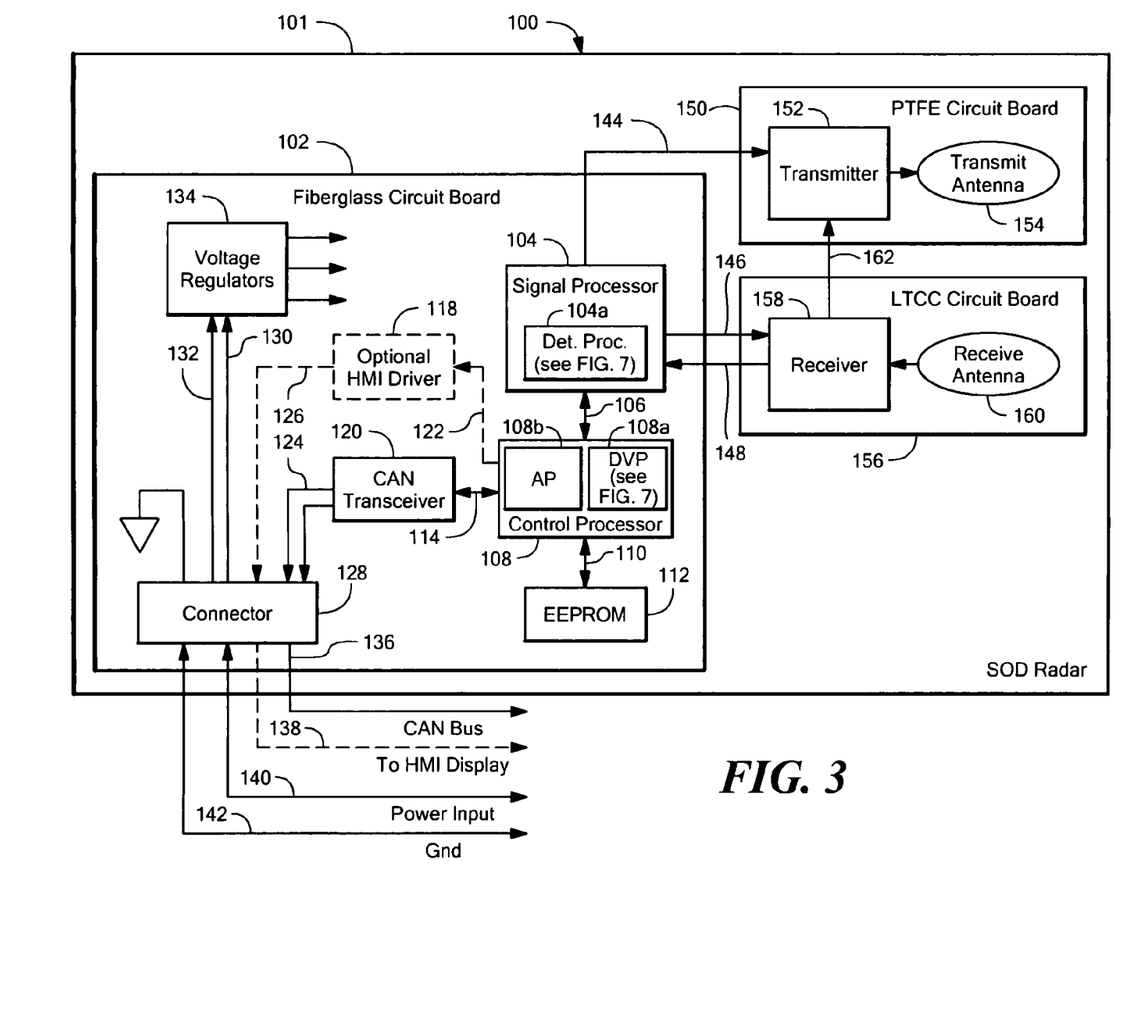
FIG. 3 is block diagram of a SOD radar.

Referring now to FIG. 3, a SOD radar 100 includes a housing 101, in which a fiberglass circuit board 102, a polytetrafluoroethylene (PTFE) circuit board 150, and a low temperature co-fired ceramic (LTCC) circuit board 156 reside. The SOD radar 100 can be the same as or similar to the SOD radars 14, 15, of FIG. 1 and 56, 58 of FIG. 2.

The fiberglass circuit board 102 has disposed thereon a signal processor 104 coupled to a control processor 108. In general, the signal processor 104 is adapted to perform signal processing functions, for example, fast Fourier transforms. The signal processor can include a detection processor 104a adapted to detect targets in the detection zone (e.g., detection zone 24, FIG. 1) of the SOD radar 100.

The control processor 108 is adapted to perform other digital functions, for example, to identify conditions under which an operator of a vehicle on which the SOD radar 100 is mounted should be alerted to the presence of another object such as a vehicle in a blind spot. To this end, the control processor 108 includes a detection verification processor 108a and an alert processor 108b, each of which are descried more fully below.

While the detection processor 104a, the detection verification processor 108a, and the alert processor 108b are shown to be partitioned among the signal processor 104 and control processor 108 in a particular way, any partitioning of the functions is possible.

The control processor 108 is coupled to an electrically erasable read-only memory (EEPROM) 112 adapted to retain a variety of values, for example, threshold values described more fully below. Other read-only memories associated with processor program memory are not shown for clarity.

The control processor 108 can also be coupled to a CAN transceiver 120, which is adapted to communicate, via a connector 128, on a CAN bus 136. The CAN bus 136 can be the same as or similar to the CAN bus 66 of FIG. 2.

The control processor 108 can also be coupled to an optional human/machine interface (HMI) driver 118, which can communicate via the connector 128 to an HMI bus 138. The HMI bus 138 can be the same as or similar to the HMI busses 68, 70 of FIG. 2. The HMI bus 138 can include any form of communication media and communication format, including, but not limited to, a fiber-optic media with an Ethernet format, and a wire media with a two-state format.

The fiberglass circuit board 102 receives a power signal 140 and a ground signal 142. In a U.S. automobile, the power signal 140 would typically be provided as a 12 Volt DC signal (relative to the ground signal 142). The system may of course be adapted to use other voltage levels (e.g. voltage levels used in European automobiles). Via the connector 128, the power and ground signals 140, 142, respectively, can be coupled to one or more voltage regulators 134 (only voltage regulator one being shown in FIG. 3 for clarity), which can provide one or more respective regulated voltages to the SOD radar 100.

The SOD radar 100 also includes the PTFE circuit board 150, on which is disposed radar transmitter 152 and a transmit antenna 154, which is coupled to the transmitter 154. The transmitter 152 is coupled to the signal processor 104 and the antenna 154 is coupled to the transmitter 152.

The SOD radar 100 also includes the LTCC circuit board 156 on which is disposed a radar receiver 158 and a receive antenna 160. The receiver 158 is coupled to the signal processor 104 and to the receive antenna 160. The receiver 158 can also be coupled to the transmitter 152, providing one or more RF signals 162 described below. The radar transmitter 152 and the radar receiver 158 receive regulated voltages from the voltage regulator 134.

In some embodiments, the transmit antenna 154 and the receive antenna 160 can be of a type described, for example, in U.S. Pat. No. 6,642,908, issued Nov. 4, 2003, U.S. Pat. No. 6,492,949, issued Dec. 10, 2002, U.S. patent application Ser. No. 10/293,880, filed Nov. 13, 2002, and U.S. patent application Ser. No. 10/619,020, filed Jul. 14, 2003. Each of these patents and patent applications is incorporated herein by reference in its entirety.

In operation, the signal processor 104 generates one or more ramp signals 144 (also referred to as chirp control signals), each having a respective start voltage and a respective end voltage. The ramp signals are fed to the transmitter 152. In response to the ramp signals 144, and in response to RF signals 162 provided by the receiver 158, the transmitter 152 generates RF chirp signals having waveform characteristics controlled by the ramp signals. The RF signals are provided from the transmitter to the transmit antenna 154, where the signal is emitted (or radiated) as RF chirp signals.

The transmit antenna 154 can be configured such that the RF chirp signals are transmitted in a single transmit beam. Alternatively, the transmit antenna can be configured such that the RF chirp signal is emitted in more than one transmit beam. In either arrangement, the transmit antenna 154 transmits the RF chirp signal in an area generally encompassing the extent of a desired detection zone, for example, the detection zone 60 of FIG. 2.

The receive antenna 160 can form more than one receive beam, for example, seven receive beans 22a-22g as shown in FIG. 1. In other embodiments, 5, 6, 8, 9, 10 or 11 beams may be used. In still other embodiments, fewer than 5 or more than 5 beams can be used. Regardless of the particular number of beams, each of the receive beams, or electronics associated therewith, receives composite signals, which include at least one of received RF signals and noise signals. Signals received by the receive beams are coupled from the antenna to the radar receive 158. The radar receiver 158 performs a variety of functions, including, but not limited to, amplification, down-converting received RF signals to provide a baseband signal, and analog-to-digital (A/D) conversion of the baseband signal, resulting in a converted signal 148.

It should be appreciated that, for the SOD FMCW chirp radar system 100, the converted signal 148 has a frequency content, wherein different frequencies of peaks therein correspond to detected objects at different ranges. The above-described amplification of the receiver 158 can be a time-varying amplification, controlled, for example, by a control signal 146 provided by the signal processor 104.

The signal processor 104 analyzes the converted signals 148 to identify an object in the above-described detection zone. To this end, in one particular embodiment, the signal processor 104 performs a frequency domain conversion of the converted signals 148. In one exemplary embodiment, this is accomplished by performing an FFT (fast Fourier transform) in conjunction with each one of the receive beams.

Some objects detected in the converted signal 148 by the signal processor 104 may correspond to objects for which an operator of a vehicle has little concern and need not be alerted. For example, an operator of a vehicle may not need to be alerted as the existence of a stationary guardrail along a roadside. Thus, further criteria can be used to identify when an alert signal should be generated and sent to the operator.

The control processor 108 receives detections 106 from the signal processor 104. The control processor 108 can use the further criteria to control generation of an alert signal 114. Upon determination by the control processor 108, the alert signal 114 can be generated, which is indicative not only of an object in the detection zone, but also is indicative of an object having predetermined characteristics being in the detection zone, for example, a moving object. Alternatively, the control processor 104 can use criteria to determine that an alert signal should not be generated.

The alert signal 114 can be communicated on the CAN bus 136 by the CAN transceiver 120. In other embodiments, an alert signal 122 can be communicated on the HMI bus 138 by the optional HMI driver 118.

The fiberglass circuit board 102, the PTFE circuit board 150, and the LTCC circuit board 156 are comprised of materials having known characteristics (including but not limited to, insertion loss characteristics) for signals within particular frequency ranges. It is known, for example, that fiberglass circuit boards have acceptable signal carrying performance at signal frequencies up to a few hundred MHz. LTCC circuit boards and PTFE circuit boards are known to have acceptable signal carrying performance at much higher frequencies, however, the cost of LTCC and PTFE boards is higher than the cost of fiberglass circuit boards. Thus, the lower frequency functions of the SOD radar 100 are disposed on the fiberglass circuit board 102, while the functions having frequencies in the range of frequencies are disposed on the LTCC and on the PTFE circuit boards 150, 156, respectively.

While three circuit boards 102, 150, 156 are shown, the SOD radar 100 can be provided on more than three or fewer than three circuit boards. Also, the three circuit boards 102, 150, 156 can be comprised of materials other than those described herein.

Figure 4:
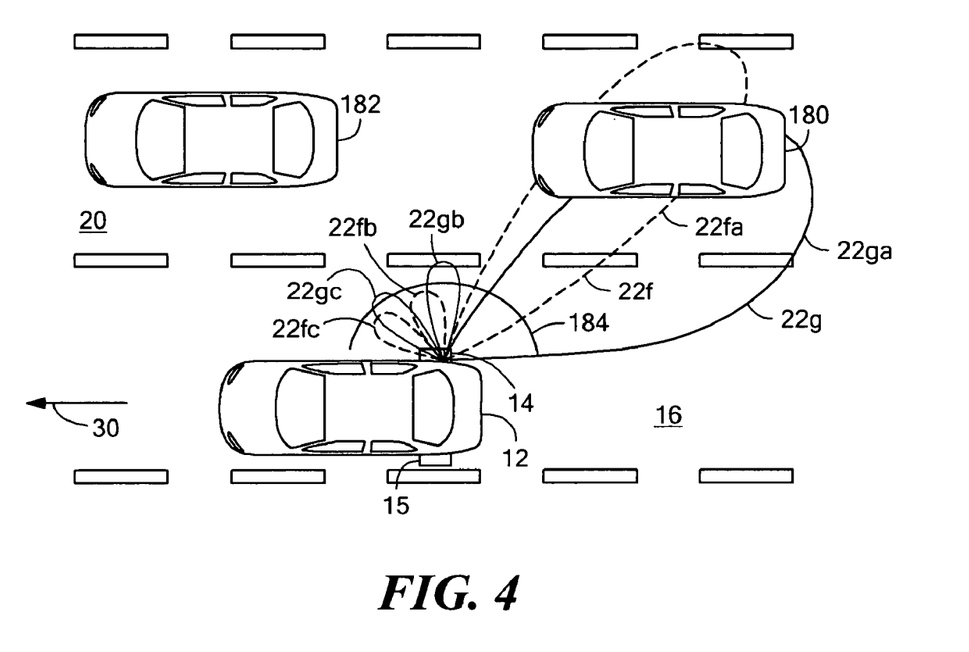
FIG. 4 is another pictorial of a vehicle on which a side object detection (SOD) radar is mounted, which is traveling on a roadway.

Referring now to FIG. 4, the first vehicle 12 (also seen in FIG. 1) is traveling in the first traffic lane 16 of a road. The vehicle 12 has the side object detection (SOD) radar 14 disposed on a side portion of the right rear quarter of the vehicle 12. The vehicle 12 also has the second SOD radar 15 disposed on a side portion of a left rear quarter of the vehicle 12. Vehicles 180, 182 are traveling in the adjacent travel lane 20.

Two of the beams 22g, 22f of FIG. 1 are shown again here, however, the beams 22g and 22f are shown in greater detail, representative of beampatterns 22g, 22f. The beampattern 22f is shown in phantom lines for clarity. The beampattern 22g includes a main lobe 22ga and two sidelobes 22gb, 22gc. The beampattern 22f includes a main lobe 22fa and two sidelobes 22fb, 22fc.

For clarity, only two sidelobes are shown for each one of the beams 22g, 22f. The number and amplitude of sidelobes are determined by a variety of factors, including, but not limited to a size of the receiving antenna associated with the SOD radar 14. Other factors are discussed below.

In general, a radar beam pattern can have not only a main lobe, of which the main lobes 22ga, 22fa are representative, but a radar beampattern can also have sidelobes, of which the sidelobes 22gb, 22gc 22fb, 22fc are representative. The vehicle 180 at a first location, which appears in both main lobes 22ga, 22fa, produces a response from the SOD radar 14 in two respective electronic channels. The vehicle 182 at the second location, which appears in antenna sidelobes 22gb, 22fb, also produces a response from the SOD radar.

It will be recognized that the beams 22g, 22f, including sidelobes, are representative of a response of the SOD at particular angles to the SOD radar 14. In other words, when the vehicle 180 is at an angle so as to be within the main lobe 22ga, a response of the SOD radar 14 is large, represented by a large main lobe 22ga. However, when the vehicle 182 is an angle so as to be within a sidelobe 22gb, a response of the SOD radar is smaller, represented by the sidelobe 22gb, which is smaller than the main lobe 22ga. The sidelobes, for example, the sidelobes 22gb, 22fb can have different magnitudes and also different angles as shown, depending on a variety of factors. Some such factors are described below. In general, the variability of the sidelobes 22gb, 22gc, 22fb, 22fc is generally greater than the variability of the main lobes 22ga, 22fa.

A threshold 184 can be used to identify detections made by the SOD radar. Referring first to main lobes 22ga, 22fa, the vehicle 180 at the first location is "seen" by main lobe 22ga, (i.e., the main lobe 22ga exceeds the threshold 184), and the vehicle 180 is detected by the SOD radar 14 in the main lobe 22ga accordingly. Similarly, the vehicle 180 at the first location is seen by the main lobe 22fa, (i.e., the main lobe 22fa also exceeds the threshold 184), and the vehicle 184 is also detected by the SOD radar 14 in the main lobe 22fa accordingly. Thus, the vehicle 180, being extended in length, is detected in two main lobes.

The vehicle 182 at the second location is "seen" by the sidelobe 22gb (i.e., the sidelobe 22gb exceeds the threshold 184), and the vehicle 184 is detected by the SOD radar 14 in the sidelobe 22gb accordingly. However, the vehicle 184 at the second location is not seen by the sidelobe 22fb (i.e., the sidelobe 22fb does not exceed the threshold 184), and the vehicle 184 is not detected by the SOD radar 14 in the sidelobe 22fb. Thus, the vehicle 182 is detected in only one of the sidelobes. Detection processing can be of a type, for example, described in U.S. Pat. No. 6,577,269, issued Jun. 10, 2003, and U.S. Pat. No. 6,683,557, issued Jan. 27, 2004.

Detection of the vehicle 182 at the second location by the sidelobe 22gb is generally not desirable. In a perfect system, no sidelobes would be present and only objects detected in the main lobes 22ga, 22fa would be detected. The vehicle 182 at the second location would preferably be detected only by another main lobe, for example the main lobe of the beam 22c (FIG. 1).

As described above, processing associated with the beams 22g, 22f when the vehicle 180 is at the first location, results in detection of the vehicle 180 in both of the main lobes 22ga, 22fa (i.e., in two electronic channels). However, processing associated with both of the beams 22g, 22f when the vehicle 182 is at the second location results in detection of the vehicle 182 in only one of the beams 22g (i.e., in one electronic channel). It will become apparent from discussion below that this characteristic can be used to distinguish a detection made in a main lobe from a detection made in a sidelobe. This characteristic can, therefore, be used to verify or validate detections.

As described above, for a given beam, e.g., beam 22g, when processing echo RF signals (or composite signals) associated with the beam 22g, it is desirable to detect (with a high probability of detection) objects that appear within a main lobe of the beam 22g. Furthermore, when processing echo RF signal (or composite signals) associated with the beam 22g, it is desirable not to detect objects (i.e., to provide a low false detection rate) that appear at other angles (i.e., in sidelobes). In this way, it is possible to use detection algorithms that can observe motion of an object as it traverses from one beam to another, for example, in order to discriminate a moving object, for example, another vehicle, from a stationary object, for example, a guardrail.

The presence and magnitude of sidelobes are influenced by a variety of factors. The factors include, but are not limited to, a geometry of antenna elements used in a receive antenna, radar reflective objects in proximity to the SOD radar 14, a shading (also referred to as a weighting) applied to signals received by each one of the array elements before combining in a beamforming process, and stray and/or feed-through signals received by the receive antenna and/or associated receive electronics. It will be appreciated that each one of these factors can have associated variability, which tends to make a sidelobes also variable from SOD radar to SOD radar and also from time to time on any SOD radar.

It would be desirable to provide well-behaved beam patterns with predictably low sidelobe levels, which are always below the threshold 184, and which results in low false detection rates for objects within the sidelobes. However, hardware required to consistently provide beam patterns with consistently low sidelobes can be costly.

Figure 5:
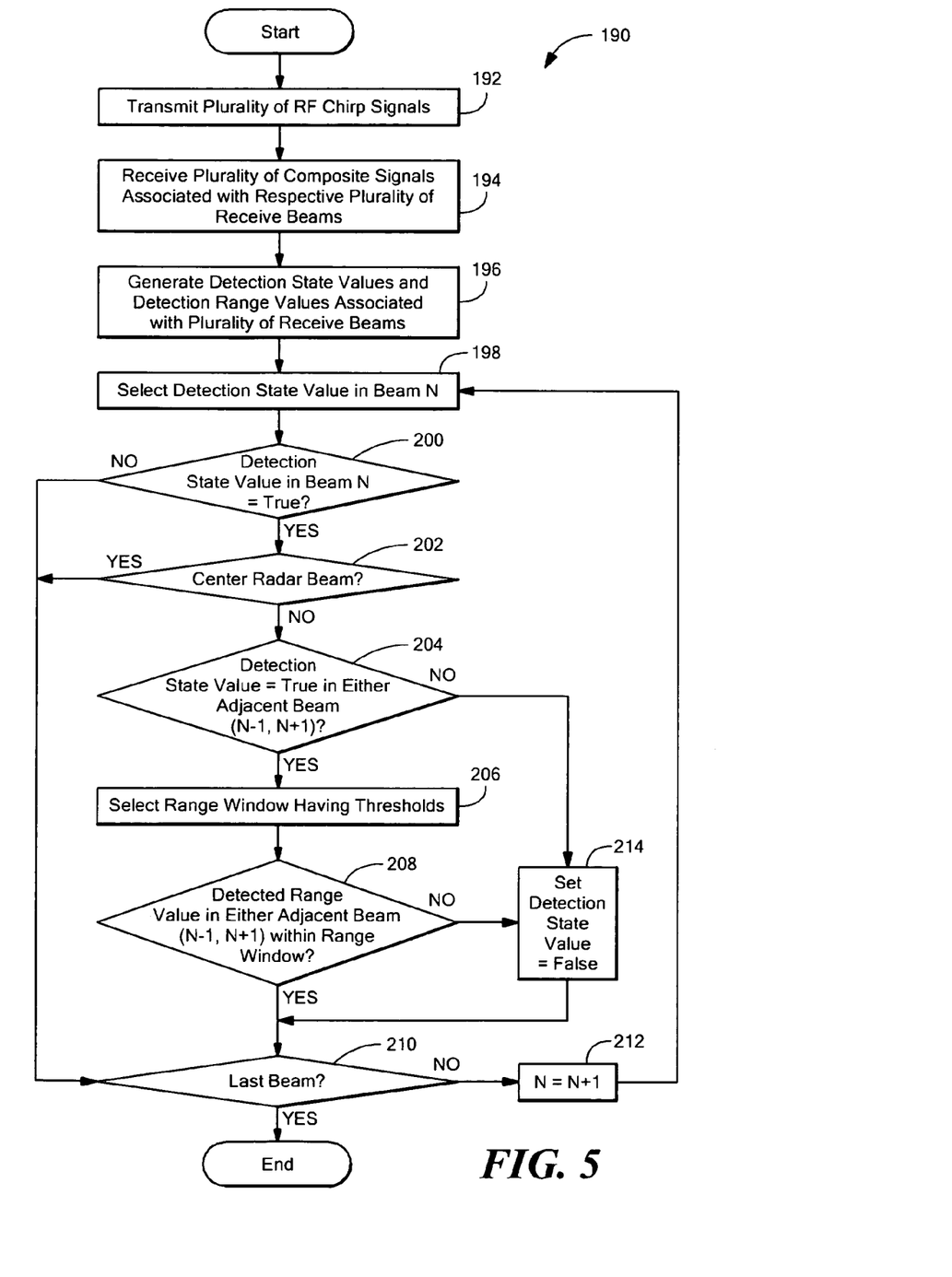
FIG. 5 is a flow chart showing a process that can be used for verifying detection made by the SOD radar of FIGS. 1-3.

It should be appreciated that FIG. 5 shows a flowchart of processing which can be implemented in the SOD radar 100 (FIG. 3) to reduce the probability of false detections in the SOD. Rectangular elements (typified by element 192 in FIG. 5), herein denoted "processing blocks," represent computer software instructions or groups of instructions. Diamond shaped elements (typified by element 200 in FIG. 5), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 5, a process 190 for reducing the probability of false detections, which can be associated with detections of objects in receive beam sidelobes, begins at block 192, wherein a plurality of RF chirp signals is transmitted. At block 194, a plurality of composite signal is received, wherein each of the composite signals includes at least one of received RF signals and noise signals. The plurality of composite signals are associated with a respective plurality of receive beams.

At block 196, a detection state value for each for receive beam is generated (i.e., one detection state value per beam). Each one of the detection state values is equal to one of a first state value or a second state value, for example, a true or a false, or a one or a zero. The first state value (e.g., true) is indicative of a detection of an object, e.g., an automobile, a guardrail, a signpost, etc. Hereafter, the first detection state value will be referred to as a true detection state value and the second detection state value will be referred to as a false detection state value.

Further at block 196, for each true detection state value, a respective detection range value is generated. The detection range value corresponds to a range to a detected target.

At block 198, one of the detection state values is selected, and, at block 180, the detection state value is tested to identify if it is a true detection state value. The selected detection state value is associated with a beam (hereafter, beam N). If at block 200, the selected detection state value is a true detection state value, then the process continues to block 202, where it is determined if the true detection state value is associated with a center beam, for example beam 22*d* of FIG. 1. If the true detection state value is not associated with the center beam, then the process continues to block 204.

At block 204, a test is performed on detection state values associated with beams N−1 and N+1, i.e., beams immediately adjacent to the beam N, with which the selected true detection state value is associated. For example, if the selected true detection state value is associated with beam 22*f* of FIG. 1, then detection state values associated with adjacent beams 22*e*, 22*g* are used for the test at block 204. On the other hand, if the selected detection state value is associated with beam 22*g* of FIG. 1, i.e., an end beam, then only the detection state value associate with adjacent beam 22*f* is used in the test at block 204.

At block 204, if the value of either one of the detection state values associated with either one of the adjacent beams N−1 or N+1 (or with the one adjacent beam, when testing an end beam) is a true detection state value, then the selected detection state value associated with beam N is partially verified and the process continues to block 206.

At block 206 a range window having upper and lower range window thresholds is selected. In general, the selected range window is selected to be a range about a range generated at block 196 in conjunction with beam N. For example, if the true detection state value in beam N has an associated detection range value of 2.0 meters, the selected range window can have a lower range window threshold such as 1.5 meters and an upper range window threshold such as 2.5 meters.

At block 208, if either one of the true detection state values associated with adjacent beams N−1 and N+1 has an associated detection range value between the range window thresholds, then the true detection state value associated with beam N is fully verified and the process continues to block 210.

At block 210, if the selected detection state value is associated with the last beam, i.e., if all detection state values in a so-called "major cycle" have been tested for verification, then the process ends. The process 190 can be repeated for each major cycle. The meaning of a major cycle is explained further below in conjunction with FIGS. 6 and 6A.

If, at block 210, the beam is not the last beam of a major cycle, the next beam is selected as N=N+1, and the process continues to block 212.

If, at block 200, the selected detection state value is not a true detection state value, the process continues to block 210.

At block 204, if both of the detection state values associated with adjacent beams are false detection state values, or, for an end beam, if the one detection state value associated with the one adjacent beam is a false detection state value, then the process continues to block 214, where the true detection state value selected at blocks 198 and 200 is un-verified, i.e., it is reversed to be a false detection state value indicative of no object detection.

At block 208, if neither of the detection range values associated with adjacent beams are between the selected range window thresholds, or, for an end beam, if the one detection range value associated with the one adjacent beam is not between the selected range window thresholds, then the process continues to block 214. At block 214, the true detection state value selected at blocks 198 and 200 is un-verified, i.e., it is reversed to be a false detection state value indicative of no object detection.

At block 202, if the beam is the center beam, then the associated detection state value is not tested, and the process ends.

By the process 190, it should be appreciated that a true detection state value can be reversed if it has no adjacent beam with a both a true detection state value and a detection range value between the selected detection range thresholds. However, in other embodiments, other logic can be used. For example in some embodiments, the detection range values are not used in the verification process, and blocks 206 and 208 are eliminated. In this case, only the detection state values of adjacent beams are used for verification.

While the center beam is shown to be excluded from verification at block 202, in other embodiments, no beam is excluded, or another beam is excluded.

Figure 6:
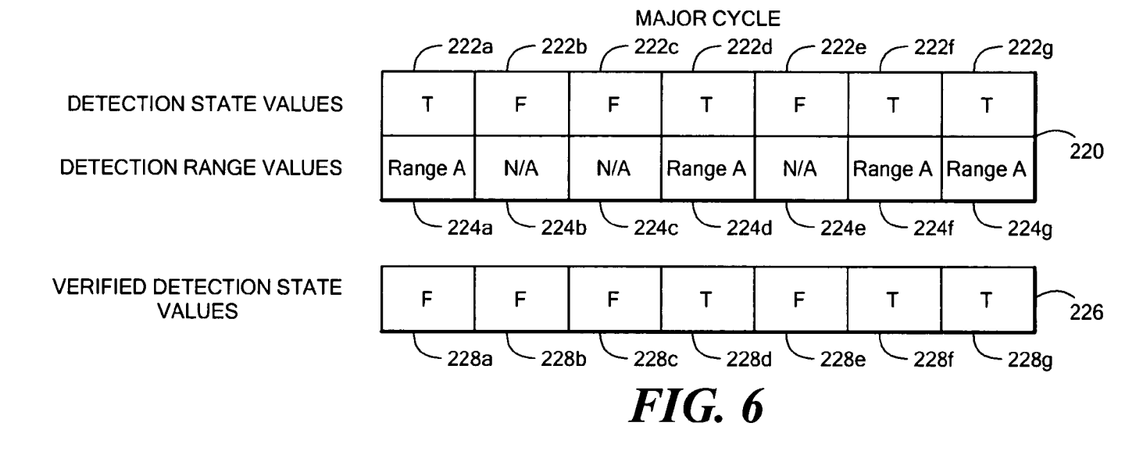
FIGS. 6 and 6A are charts showing detection state values, associated detection range values, and verified detection state values; generated by the process of FIG. 5.

Referring now to FIG. 6, processing associated with a major cycle generates a detection table 220 having detection state values 222*a*-222*g*, one for each respective one of the receive beams 22*a*-22*g* of FIG. 1 and also detection range values 224*a*-224*g*. Only beams for which an object is detected (i.e., beams which have a detection state value equal to true) have detection range values. Other beams, for which the detection state value is false, e.g., 222*c*, have either no detection range value, or a default detection range value, for example, zero.

Values 222*a*-222*g*, 224*a*-224*g* in the detection table 220 can be generated in series or in parallel. Another set of values can be generated for each successive major cycle. Here, however, and in the process 190 of FIG. 5, only one major cycle is shown and described. It will be understood, however, that the process 190 of FIG. 5 can be repeated using values for each major cycle.

A verified set 226 of detection state values 228*a*-228*g*, shows that one of the detection state values 222*a* has been unverified, i.e., reversed. Taking the detection state value 222*a*, which is a true detection state value, and inspecting the adjacent detection state value 222*b*, the detection state value 222*b* is a false detection state value. Therefore, the detection state value 222*a* is un-verified, resulting in a false verified detection state value 228*a*.

Taking another true detection state value 222*f* as an example, the true detection state value 222*f* has a range detection state value equal to range A. The true detection state value 222*f* has an adjacent detection state values 222*g*, which is a true detection state value. Furthermore, the detection state value 222*g* has an associated detection range value 224*g* approximately equal to range A. Thus, two conditions are met and the detection state value 222*f* is verified, resulting in a true verified detection state value 228*f*. The two conditions are that the true detection state value 222*f* must have at least one adjacent detection state value that is true, which is met by the detection state value 222*g*, and that detection state value 222*g* must have a detection range value 224*g* that falls in a range window about the detection range value 224*f*, which is met.

It should be noted that, in some embodiments, as described above, the detection state value 222*d*, which is associated with a center beam, is not tested. Therefore, in some embodiments, though the above two conditions are not met for the detection state value 222*d*, the detection state value 222*d* becomes a verified detection state value 228*d*, without being tested.

Figure 6A:
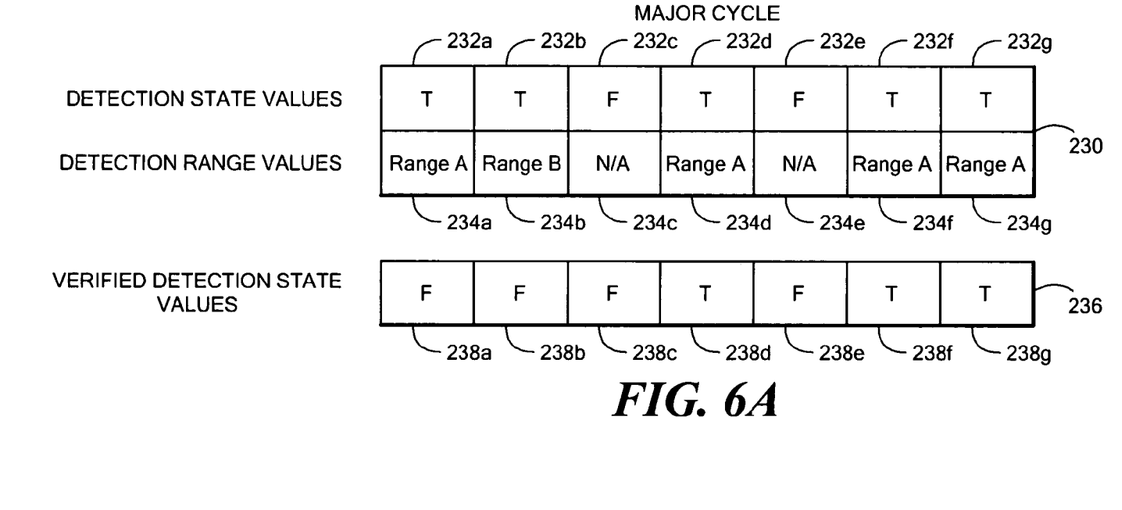

Referring now to FIG. 6A, processing associated with another major cycle generates a detection table 230 having detection state values 232*a*-232*g*, one for each respective one of the receive beams 22*a*-22*g* of FIG. 1, and also detection range values 234*a*-234*g*.

A verified set 236 of detection state values 238*a*-238*g*, shows that several of the detection state values 232*a*-232*g* have been unverified, i.e., reversed. Taking the detection state value 232*a*, which is a true detection state value, and inspecting the one adjacent detection state value 232*b*, the adjacent detection state value 232*b* is a true detection state value. However, the detection range value 234*b* is not within a range window of the detection range value 234*a*. Therefore, the true detection state value 232*a* is reversed, becoming the false verified detection state value 238*a*. Other detection state value reversals should be evident from FIG. 6A.

As described above, in some embodiments, the detection range values, e.g., 234*a*-234*g*, are not used in the verification. In these embodiments, the detection state value 232*a* would not be reversed and the detection state value 238*a* would be a true verified detection state value.

Figure 7:
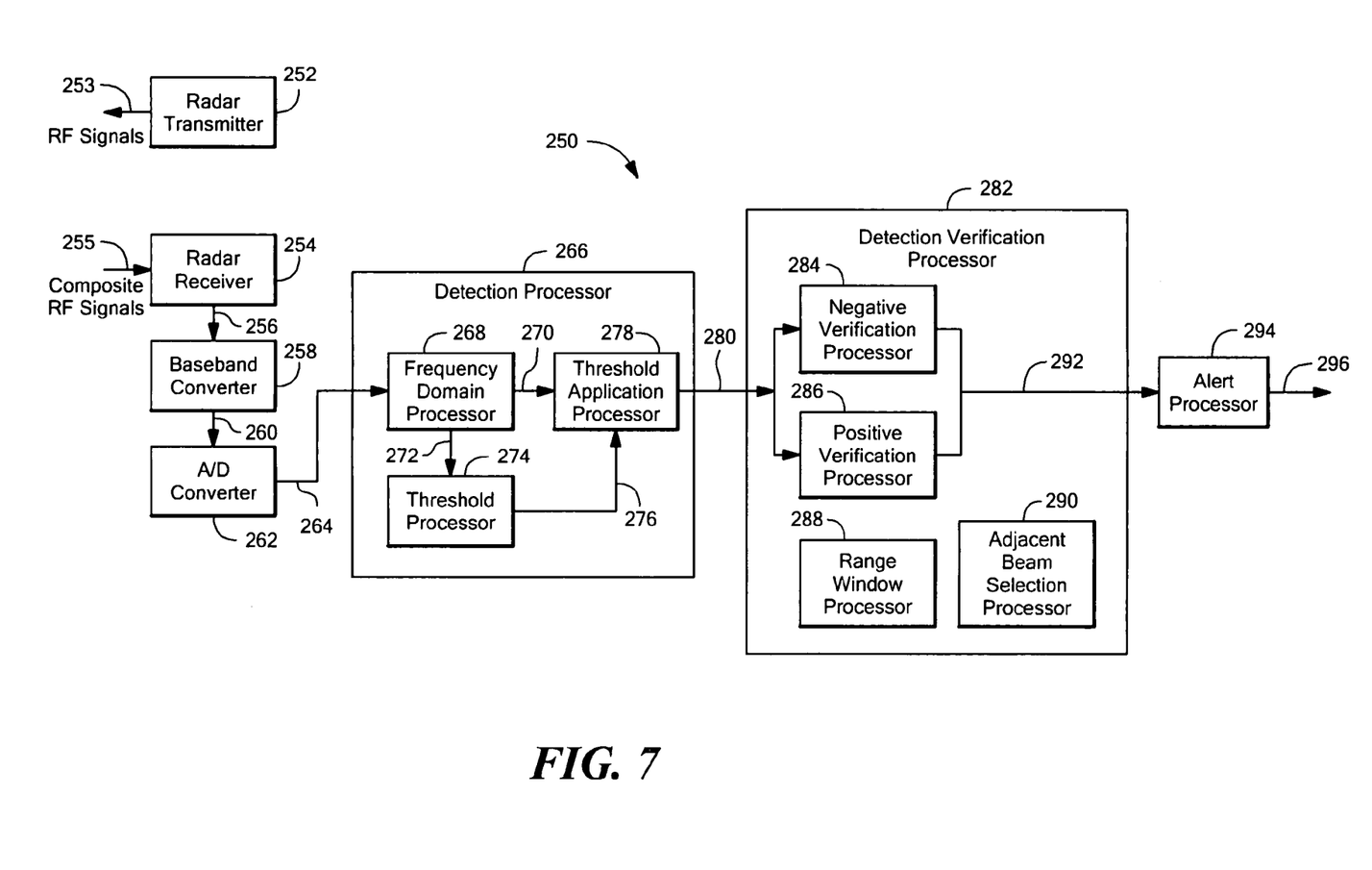
FIG. 7 is a block diagram showing further details of the SOD radar of FIGS. 1-3.

Referring now to FIG. 7, a SOD radar 250 can be the same as or similar to the SOD radar 100 of FIG. 3. The SOD radar 250 includes a radar transmitter 252 adapted to generate chirp RF signals 253. The radar transmitter 252 can be the same as or similar to the transmitter 152 and transmit antenna 154 of FIG. 3. The SOD radar 250 also includes a radar receiver 254 adapted to receive composite signals 255, which can include echo RF signals.

The radar receiver 254 can provide radio frequency (RF) signals 256 to a baseband converter 258. The baseband converter 258 is adapted to convert the RF signals 256 to baseband signals 260, which are provided to an A/D converter 262. The baseband signals 260 are generated by converting the RF signals 256 to a lower frequency. The radar receiver 254 in combination with the baseband converter 258 and the A/D converter 262 can be the same as or similar to the receiver 158 and receive antenna 160 of FIG. 3.

The A/D converter 262 provides digital signals 264 to a detection processor 266. The detection processor 266 includes those elements, which can perform functions that can be performed by the signal processor 104 and/or the control processor 108 of FIG. 3. The detection processor 266 can be the same as or similar to the detection processor 104*a* of FIG. 3.

The detection processor 266 includes a frequency domain processor 268 adapted to receive the digital signals 264 and to convert the digital signals 264 to frequency domain signals 270, 272. The frequency domain signals 272 are received by a threshold processor 274, which generates one or more detection thresholds 276. The frequency domain signals 270 and the detection thresholds 276 are received by a threshold application processor 278. The threshold application processor 278 is adapted to compare the frequency domain signals 270 with the detection thresholds 276 and to provide a detection signal 278 (i.e., a detection table) indicative of the presence or absence of an object in a detection zone (e.g. 24, FIG. 1), also referred to herein as a field of view (FOV), of the SOD radar 250. The detection signals 280 can be the same as or similar to the detection table 220 of FIG. 6, having the detection state values 222*a*-222*g* and the detection range values 224*a*-224*g* of FIG. 6.

A detection verification processor 282 is adapted to receive the detection signals 280 and to further process the detection signals 280 in order to apply further criteria to validate or to invalidate a detection of an object, for example, using the process 190 described above in conjunction with FIG. 5. The detection verification processor 282 can generate verified detection signals 292 accordingly. The detection verification processor 380 can be the same as or similar to the detection verification processor 108*a* described above in conjunction with FIG. 3. The verified detection signals can be the same as or similar to the verified detection state values 226, 236 described above in conjunction with FIG. 6.

The detection verification processor 282 can include a negative verification processor and a positive verification processor, which are adapted to receive the detection signals 280, to provide positive and negative verifications of the detection state values within the detection signals 280, and to generate the verified detection signals 292 accordingly. To this end, the detection verification processor 282 can include a range window processor 288 adapted to generate the above-described range window thresholds. The negative verification processor 284 and the positive verification processor 286 can receive the range windows. The detection verification processor 282 can also include an adjacent beam selection processor 290 adapted to identify adjacent beams associated with a beam selected for verification by the negative verification processor 284 and/or by the positive verification processor 286.

An alert processor 294 is adapted to receive the verified detection signals 292 and to generate an alert signal 296 in accordance with a "true" detection state value in the verified detection signals 292. The alert signal 296 can be in a variety of forms, including, but not limited to, a visual alert signal and an audible alert signal to an operator of a vehicle. The alert signal 296 makes an operator of a vehicle, for example, the vehicle 12 of FIG. 1, upon which the SOD radar 250 is mounted, aware of another vehicle (e.g. vehicle 18 in FIG. 1) to the side of the vehicle 12. The alert processor 294 can be the same as or similar to the alert processor 108*b* of FIG. 3.

Functions of the detection processor 266, the detection verification processor 282, and the alert processor 294 can be performed by the signal processor 104 and/or the control processor 108 of FIG. 3, with any partitioning among the signal processor 104 and control processor 108.

In some embodiments, the range window processor 288 is omitted, wherein the negative verification processor 284 and by the positive verification processor 286 make verification decisions based only upon detection state values associated with adjacent beams, as described above in conjunction with FIG. 5.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of verifying a radar detection, comprising:
transmitting a plurality of RF signals;
receiving a plurality of composite signals associated with a respective plurality of receive beams;
generating a respective detection state value associated with each one of the receive beams, wherein each one of the detection state values is equal to a selected one of a first state value and a second state value, wherein the first state value is indicative of a detection;
for each of the detection state values equal to the first state value, generating a respective detection range value;
selecting one of the detection state values equal to the first state value;
verifying the selected detection state value to provide one of a positive verification and a negative verification associated with the selected detection state value; and
setting the selected detection state value to be equal to the second state value in response to a negative verification.

2. The method of claim 1, wherein the selected one of the detection state values corresponds to a selected one of the plurality of receive beams, wherein the verifying comprises:
selecting at least one of:
a first adjacent detection state value, wherein the first adjacent detection state value is associated with a first adjacent one of the plurality of receive beams adjacent to the selected one of the plurality of receive beams, or
a second adjacent detection state value, wherein the second adjacent detection state value is associated with a second adjacent one of the plurality of receive beams adjacent to the selected one of the plurality of receive beams;
generating a positive verification in response to at least one of the first adjacent detection state value or the second adjacent detection state value being equal to the first state value; and
generating a negative verification in response to at least one of the first adjacent detection state value or the second adjacent detection state value not being equal to the first state value.

3. The method of claim 1, wherein the selected one of the detection state values corresponds to a selected one of the plurality of receive beams, and wherein the selected one of the detection state values is associated with a generated detection range value, wherein the verifying comprises:
selecting at least one of:
a first adjacent detection state value, wherein the first adjacent detection state value is associated with a first adjacent one of the plurality of receive beams adjacent to the selected one of the plurality of receive beams, or
a second adjacent detection state value, wherein the second adjacent detection state value is associated with a second adjacent one of the plurality of beams adjacent to the selected one of the plurality of receive beams;
selecting a range window associated with the generated detection range value;
generating a positive verification in response to at least one of the first adjacent detection state value or the second adjacent detection state value being equal to the first state value and in response to a detection range value associated with the at least one of the first adjacent detection state value or the second adjacent detection state value equal to the first state value being within the range window; and
generating a negative verification in response to at least one of the first adjacent detection state value or the second adjacent detection state value not being equal to the first state value or in response to a detection range value associated with the at least one of the first adjacent detection state value or the second adjacent detection state value equal to the first state value not being within the range window.

4. The method of claim 1, wherein adjacent ones of the plurality of receive beams are disposed to overlap.

5. The method of claim 1, wherein adjacent ones of the plurality of receive beams are azimuthally disposed to overlap.

6. The method of claim 1, wherein the transmitted RF signals comprise RF chirp signals.

7. The method of claim 1, wherein the generating a respective detection state value comprises:
converting the plurality of received composite signals to provide a plurality of baseband radar signals;
transforming the plurality of baseband radar signals to the frequency domain to provide a respective plurality of frequency domain signals;
selecting a respective threshold associated with each one of the plurality of frequency domain signals; and
applying the respective thresholds to each one of the plurality of frequency domain signals.

8. Apparatus for verifying a radar detection, comprising:
a radar transmitter adapted to transmit a plurality of RF signals;
a radar receiver adapted to receive a plurality of composite signals associated with a respective plurality of receive beams;
a detection processor adapted to generate a respective detection state value associated with each of the receive beams, wherein each one of the detection state values is equal to a selected one of a first state value and a second state value, wherein the first state value is indicative of a detection, and further adapted to generate a respective detection range value for each of the detection state values equal to the first state value; and
a detection verification processor adapted to select one of the detection state values equal to the first state value, further adapted to verify the selected detection state value to provide one of a positive verification and a negative verification associated with the selected detection state value, and still further adapted to set the selected detection state value to be equal to the second state value in response to a negative verification.

9. The apparatus of claim 8, wherein the selected one of the detection state values corresponds to a selected one of the plurality of receive beams, wherein the detection verification processor comprises:
an adjacent beam selection processor adapted to select at least one of:
a first adjacent detection state value, wherein the first adjacent detection state value is associated with a first adjacent one of the plurality of receive beams adjacent to the selected one of the plurality of receive beams, or
a second adjacent detection state value, wherein the second adjacent detection state value is associated with a second adjacent one of the plurality of receive beams adjacent to the selected one of the plurality of receive beams;

a positive verification processor adapted to generate a positive verification in response to at least one of the first adjacent detection state value or the second adjacent detection state value being equal to the first state value; and a negative verification processor adapted to generate a negative verification in response to at least one of the first adjacent detection state value or the second adjacent detection state value not being equal to the first state value.

10. The apparatus of claim 8, wherein the selected one of the detection state values corresponds to a selected one of the plurality of receive beams, and wherein the selected one of the detection state values is associated with a generated detection range value, wherein the detection verification processor comprises:

an adjacent beam selection processor adapted to select at least one of:
- a first adjacent detection state value, wherein the first adjacent detection state value is associated with a first adjacent one of the plurality of receive beams adjacent to the selected one of the plurality of receive beams, or
- a second adjacent detection state value, wherein the second adjacent detection state value is associated with a second adjacent one of the plurality of beams adjacent to the selected one of the plurality of receive beams;

a range window processor adapted to select a range window associated with the generated detection range value;

a positive verification processor adapted to generate a positive verification in response to at least one of the first adjacent detection state value or the second adjacent detection state value being equal to the first state value and in response to a detection range value associated with the at least one of the first adjacent detection state value or the second adjacent detection state value equal to the first state value being within the range window; and a negative verification processor adapted to generate a negative verification in response to at least one of the first adjacent detection state value or the second adjacent detection state value not being equal to the first state value or in response to a detection range value associated with the at least one of the first adjacent detection state value or the second adjacent detection state value equal to the first state value not being within the range window.

11. The apparatus of claim 8, wherein adjacent ones of the plurality of receive beams are disposed to overlap.

12. The apparatus of claim 8, wherein adjacent ones of the plurality of receive beams are azimuthally disposed to overlap.

13. The apparatus of claim 8, wherein the transmitted RF signals comprise RF chirp signals.

14. The apparatus of claim 8, wherein the detection processor comprises:

a frequency domain processor adapted to transform a plurality of baseband radar signals to the frequency domain to provide a respective plurality of frequency domain signals;

a threshold processor adapted to select a respective threshold associated with each one of the plurality of frequency domain signals; and a threshold application processor adapted to apply the respective thresholds to each one of the plurality of frequency domain signals.

* * * * *

UNITED STATES PATENT AND TRADEMARK OFFICE
CERTIFICATE OF CORRECTION

PATENT NO. : 7,379,018 B1
APPLICATION NO. : 11/324073
DATED : May 27, 2008
INVENTOR(S) : Lohmeier et al.

It is certified that error appears in the above-identified patent and that said Letters Patent is hereby corrected as shown below:

Column 9, line 4 delete "is an" and replace with --is at an--.

Column 9, line 60 delete "signal" and replace with --signals--.

Column 10, line 11 delete "make a sidelobes" and replace with --make sidelobes--.

Column 10, line 16 delete "results" and replace with --result--.

Column 10, lines 18-19 delete "beam patterns" and replace with --beampatterns--.

Column 10, line 53 delete "signal is" and replace with --signals is--.

Column 10, line 58 delete "for each for" and replace with --for each--.

Column 12, line 15 delete "with a both" and replace with --with both--.

Column 12, line 53 delete "values" and replace with --value--.

Column 14, line 11 delete "380" and replace with --282--.

Column 14, lines 53-54 delete "and by the" and replace with --and the--.

Column 1, line 47 delete "show)" and replace with --snow)--.

Column 1, line 59 delete "signal" and replace with --signals--.

Column 2, line 9 delete "accordance a" and replace with --accordance with a--.

Column 2, lines 9-10 delete "invention apparatus" and replace with --invention, apparatus--.

Column 2, line 47 delete "detection" and replace with --a detection--.

Signed and Sealed this

Eighteenth Day of May, 2010

David J. Kappos
*Director of the United States Patent and Trademark Office*

CERTIFICATE OF CORRECTION (continued)
U.S. Pat. No. 7,379,018 B1

Column 3, line 13 delete "simple" and replace with --simply--.

Column 3, line 29 delete ", etc.)" and replace with --, etc.).--.

Column 3, line 34 delete "herein below" and replace with --hereinbelow--.

Column 5, line 10 delete "SOC" and replace with --SOD--.

Column 7, line 38 delete "receive" and replace with --receiver--.

Column 7, line 64 delete "as the" and replace with --as to the--.

Column 8, line 28 delete "frequencies in the range of frequencies" and replace with --frequencies in the range of RF frequencies--.